United States Patent [19]
Bauer

[11] 3,710,343
[45] Jan. 9, 1973

[54] STRIP CHART DRIVE MECHANISM FOR A RECORDER

[75] Inventor: Werner R. Bauer, Radnor, Pa.

[73] Assignee: Robertshaw Controls Company, Richmond, Va.

[22] Filed: Oct. 13, 1971

[21] Appl. No.: 188,843

[52] U.S. Cl. ..................346/136, 226/188, 242/67.2
[51] Int. Cl. ............................................G01d 15/24
[58] Field of Search.........346/136; 242/67.2, 67.3 R; 226/188

[56] References Cited

UNITED STATES PATENTS

| | | | |
|---|---|---|---|
| 2,845,232 | 7/1958 | Johnson et al | 242/67.2 |
| 3,307,199 | 2/1967 | Zeitlin | 346/136 X |

Primary Examiner—Joseph W. Hartary
Attorney—Auzville Jackson, Jr. et al.

[57] ABSTRACT

In a multipoint recorder having a movable strip chart for recording purposes and marking means for marking on said chart as said chart is being moved by chart drive means wherein the chart drive means comprises a strip chart supply roll, a chart drive roll and a chart take-up roll with the chart being fed from the supply roll around part of the drive roll and on to the take-up roll, the improvement wherein a drive gear is coupled by a coupling that interconnects the drive gear to the drive roll without slippage therebetween when the coupling is in a locked position thereof and that disconnects the drive gear from the drive roll when in an unlocked position thereof. A manipulator means is interconnected by a slip clutch to the drive roll whereby the manipulator means cannot turn the drive roll independently of the drive gear unless the coupling is in the unlocked position thereof.

20 Claims, 10 Drawing Figures

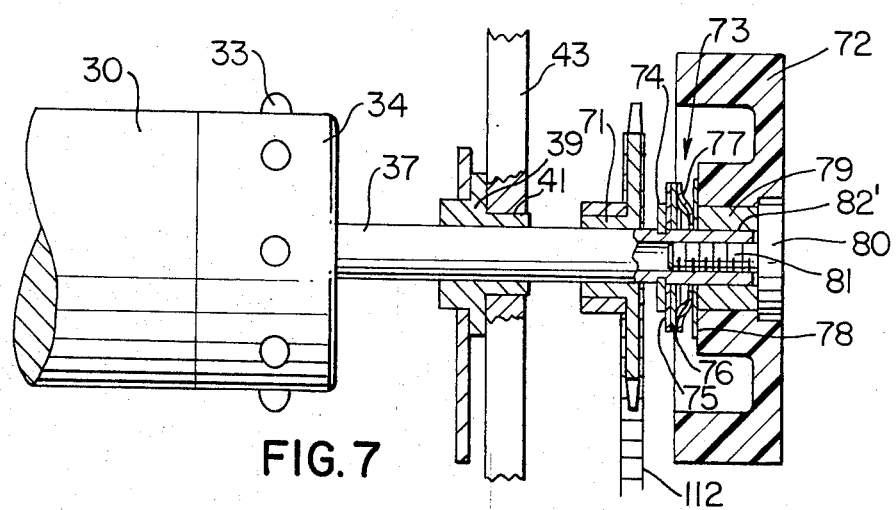
FIG. 7
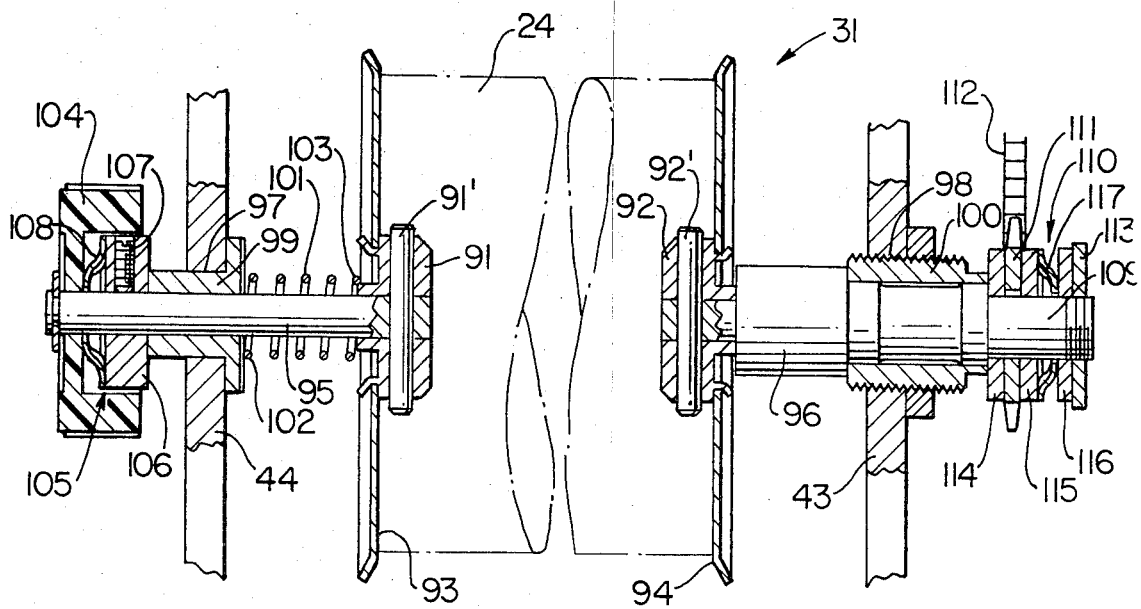
FIG. 8
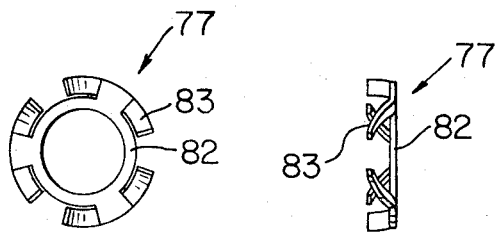
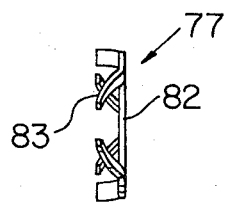
FIG. 9  FIG. 10

STRIP CHART DRIVE MECHANISM FOR A RECORDER

BACKGROUND OF THE INVENTION

Multipoint recorders have been provided wherein a print head assembly is adapted to be positioned relative to a movable strip chart of the recorder by positioning means so that the print head assembly can automatically print on the chart at the various positions thereof.

The strip chart drive mechanism for such recorders have been so constructed and arranged that the chart drive roll thereof is adapted to be moved independently of the drive gear arrangement therefor during a pull out of the recorded portion of the chart for review thereof so that the accuracy of the printing on the continuously moving strip chart is impaired.

SUMMARY

This invention provides an improved strip chart drive mechanism for such a recorder as well as for other devices as desired, such strip chart drive mechanism of this invention preventing the accidental movement of the chart drive roll relative to the drive gearing therefor unless the drive gearing is manually disconnected from the drive roll so that even though manipulator means are provided for manually rotating the strip chart drive roll, such manipulator means cannot be utilized until the drive gear is manually disconnected from the drive roll.

In particular, the strip chart drive mechanism of this invention comprises a strip chart supply roll, a chart drive roll and a chart take-up roll with the strip chart being fed from the supply roll around part of the drive roll and onto the take-up roll. A coupling interconnects a drive gear to the drive roll without slippage therebetween when the coupling is in a locked position thereof and will disconnect the drive gear from the drive roll when the coupling is in an unlocked position thereof. A manual manipulator means is interconnected by a slip clutch to the drive roll whereby the manual manipulator means cannot turn the drive roll independently of the drive gear unless the coupling is manually placed in its unlocked position. Thus, with the coupling in its locked condition, a person pulling out the recorded portion of the strip chart to review the same cannot cause an accidental turning of the drive roll relative to the drive gear therefor whereby the chart is still being driven at a constant speed past the print head assembly during such review of the recorded portion of the chart without fear of the printing accuracy being impaired.

Accordingly, it is the object of this invention to provide a recorder utilizing the improved strip chart drive mechanism of this invention, the strip chart drive mechanism having one or more of the novel features set forth above or hereinafter shown or described.

Another object of this invention is to provide an improved strip chart drive mechanism having one or more of the novel features set forth above or hereinafter shown or described.

Other objects, uses and advantages of this invention are apparent from the reading of this description which proceeds with reference to the accompanying drawings forming a part thereof and wherein:

DESCRIPTION OF THE DRAWINGS

FIG. 7 is an enlarged, fragmentary cross-sectional view taken on line 7—7 of FIG. 5 and illustrates a manual manipulator of the chart drive mechanism interconnected to the drive roll.

FIG. 8 is an enlarged, fragmentary, cross-sectional view taken on line 8—8 (enlarged) and illustrating the take-up roll arrangement.

FIG. 9 is a front view of one of the clutch springs utilized in the chart drive mechanism.

FIG. 10 is a side view of the clutch springs illustrated in FIG. 9.

DESCRIPTION OF ILLUSTRATED EMBODIMENT

Figure 1:
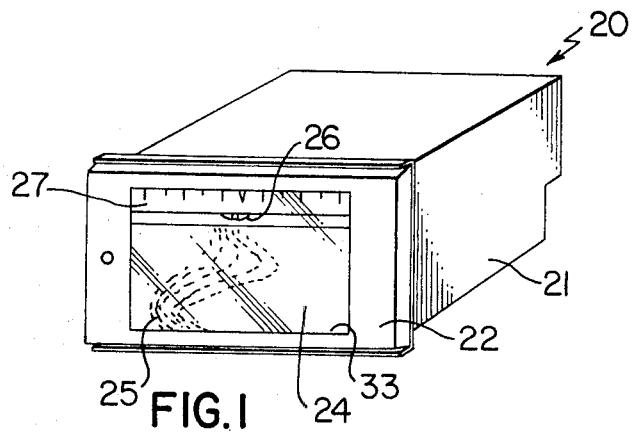
FIG. 1 is a front perspective view of the improved multipoint recorder of this invention.

While the various features of this invention are hereinafter described and illustrated as being particularly adapted to provide a chart drive mechanism for a multipoint recorder, it is to be understood that the various features of this invention can be utilized singly or in any combination thereof to provide a strip drive mechanism for other devices as desired.

Therefore, this invention is not to be limited to only the embodiment illustrated in the drawings, because the drawings are merely utilized to illustrate one of the wide variety of uses of this invention.

Figure 2:
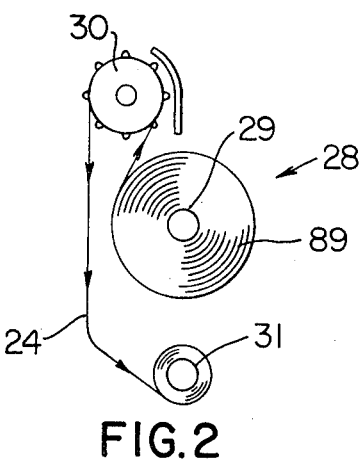
FIG. 2 is a side schematic view illustrating the chart drive mechanism of this invention.
Figure 3:
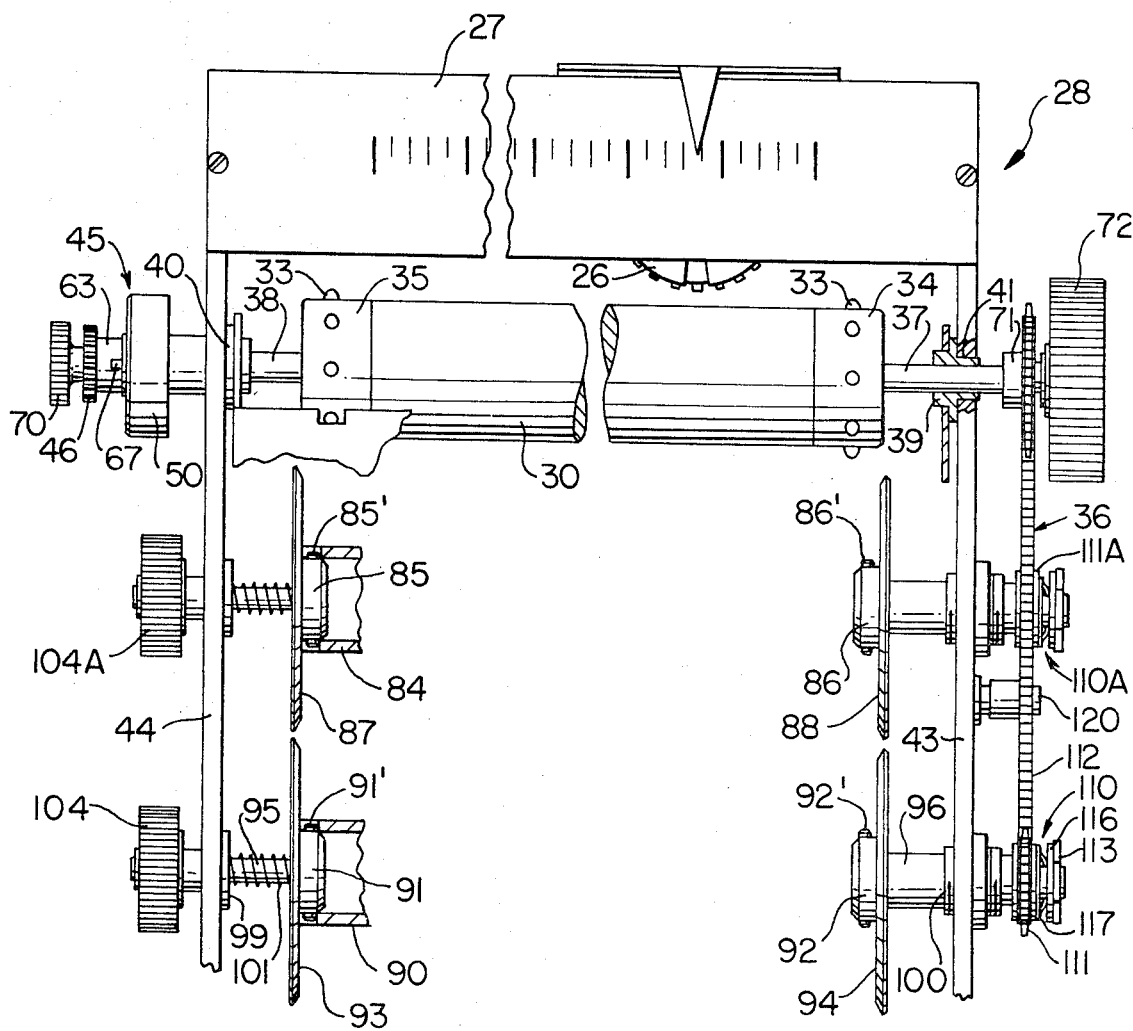
FIG. 3 is an enlarged front view of the recorder of FIG. 1 with the casing removed and illustrating the chart drive mechanism of this invention.

Referring now to FIGS. 1, 2 and 3, the multipoint recorder of this invention is generally indicated by the reference numeral 20 and comprises a casing or frame 21 having a front wall 22 provided with a window 23 therein for visually exposing a recording strip chart 24 that has markings 25 printed thereon by a print head assembly 26 whereby the recorder 20 through the print head assembly 26 and chart 24 provide a permanent record as well as an immediate visual indication of the conditions being sensed by the recorder 20.

For example, it is well known that such multipoint recorders have been provided for successively measuring and recording several measured values on a common paper strip chart or the like that is continuously threaded past the print head assembly by a drive motor or the like. Any measured variables available as electrical values or which can be transformed into such values can be recorded extremely accurately by a potentiometric recorder. Some fields of application are measurements of current, voltages, and resistances, temperatures (thermo-couple, resistance, sensors), physical and physio-chemical gas analysis (connection of gas analyzers), and very accurate measurements of angular positions (resistance, teletransmitters), etc.

In general, the potentiometer measuring circuit for the multiple multipoint recorder is an adjusted, calibrated DC voltage source connected to oppose an input signal voltage. The difference between the input signal voltage and the measuring voltage of the potentiometer produces an error signal. This error signal is detected by the input circuit of an amplifier where it is converted to a signal and then amplified. After amplification, the error signal is applied to a balancing (step/servo) motor which with its associated mechanical system, works to readjust the calibrated measuring voltage. The system is sensitive to the polarity of error current so that the balancing motor turns in the proper direction to reduce the magnitude of the error current. The balancing motor continues to drive until the error current is substantially zero. A null or balanced condition then exists. While adjusting the measuring voltage, the balancing motor also drives the print head assembly of the recorder through a drive wire or cord disposed about conventional pulleys whereby the thus positioned print head assembly prints on the chart to indicate and record the magnitude of the signal.

As previously stated, it is a feature of this invention to provide an improved strip chart drive mechanism for the recorder 20 so it is merely sufficient to state that the print head assembly 26 is axially positioned relative to the front scale 27 of the recorder 20 illustrated in FIGS. 1 and 3 by the balancing motor (not shown) and periodically the print head assembly 26 moves downwardly to print on the chart 24 to indicate the position of the print head assembly 26 at that particular time as the strip chart 24 continuously moves below the print head assembly 26 in a manner now to be described.

Figure 4:
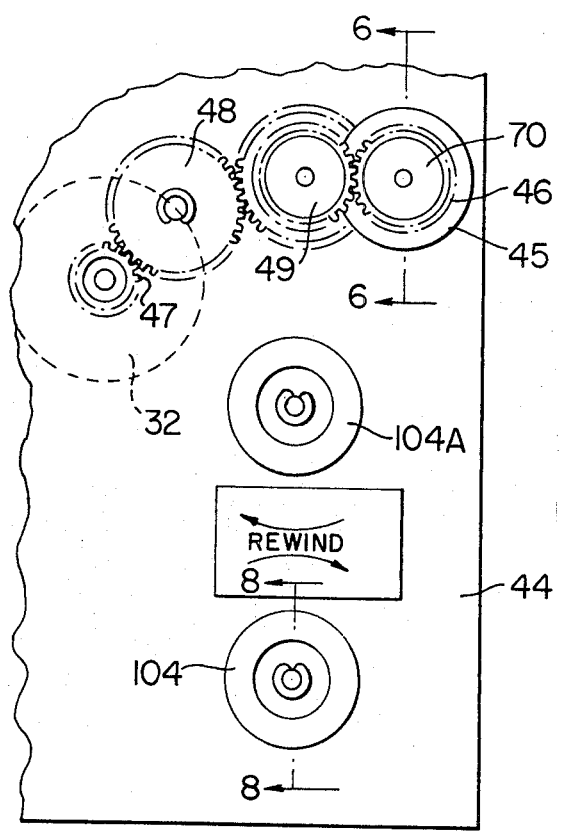
FIG. 4 is a fragmentary left side view of the chart drive mechanism of FIG. 3.

As illustrated in FIGS. 2 and 3, the strip chart drive mechanism of this invention is generally indicated by the reference numeral 28 and comprises a supply roll means 29, a drive roll means 30 and a take-up roll means 31 so arranged that the strip chart 24 is fed from the supply roll 29 around part of the drive roll 30 and onto the take-up roll 31 to be continuously moved by the chart drive mechanism 28 in the direction of the arrows of FIG. 2 at a substantially constant speed by an electric drive motor 32, FIG. 4, so as to pass beneath the print head assembly 26 at a constant speed with the drive roll 30 providing a platen arrangement underneath the chart 24 where the print head assembly 26 can print on the chart 24 at the drive roll 30.

Figure 5:
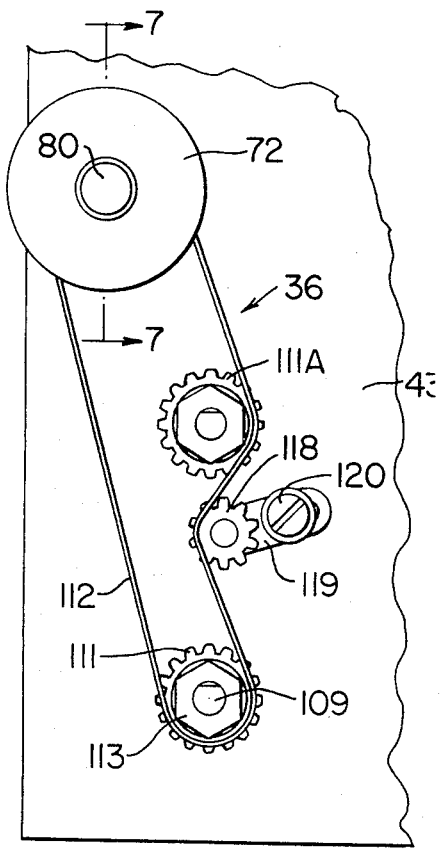
FIG. 5 is a fragmentary right side view of the chart drive mechanism of FIG. 3.
Figure 6:
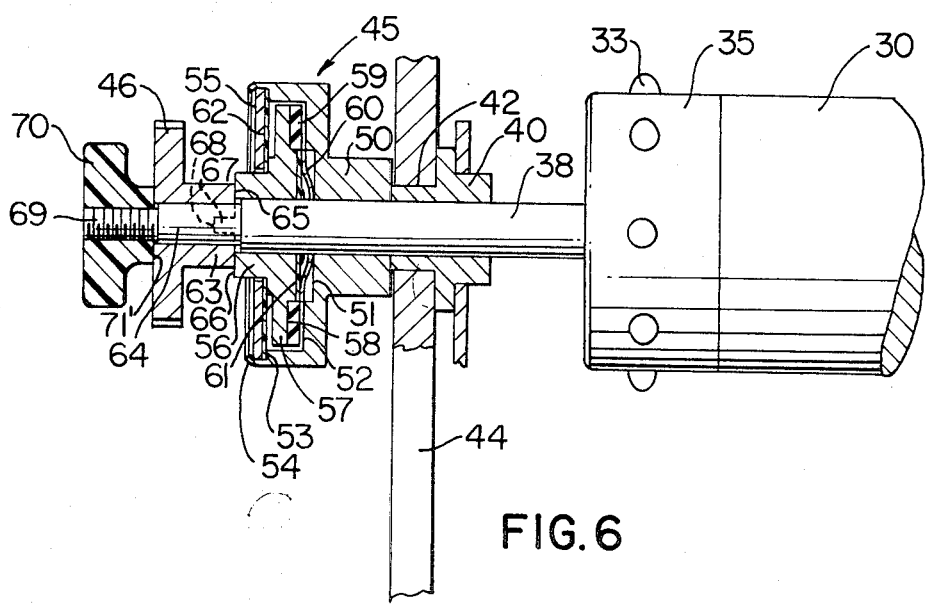
FIG. 6 is an enlarged, fragmentary, cross-sectional view taken on line 6—6 of FIG. 4 and illustrating the coupling for interconnecting the drive gear to the drive roll.

As illustrated in FIGS. 3, 6 and 7, the drive roll 30 has a plurality of outwardly directed and radially disposed sprocket-like driving teeth 33 on the opposed ends 34 and 35 thereof for registering with like openings in the edges of the strip chart 24 as the same passes around the drive roll 30, illustrated in FIG. 2, so that the strip chart 24 is directly driven by the drive roll 30 without slippage therebetween from the supply roll 29. A drive chain arrangement generally indicated by the reference numeral 36 in FIGS. 3 and 5 is provided and causes the supply roll 29 and take-up roll 31 to rotate to respectively feed the strip 24 to the drive roll 30 and to take up the recorded portion of the chart 24 after the same passes the drive roll 30, the drive chain arrangement 36 being directly driven by the drive roll 30 in a manner hereinafter described.

The drive roll 30 has shaft portions 37 and 38 respectively interconnected to and extending outwardly from the opposed ends 34 and 35 thereof to be respectively journaled in bearing means 39 and 40 respectively disposed in openings 41 and 42 formed in side frame members 43 and 44 of the recorder 20 whereby the drive roll 30 is rotatably mounted to the frame 21 of the recorder 20.

The shaft portion 38 extends beyond the side frame member 44 and is adapted to be interconnected by a coupling structure 45 of this invention to a drive gear 46 that is in direct drive relation with an output drive gear 47 of the electric motor 32 by a pair of intermediate transmission gears 48, 49 as illustrated in FIG. 4. Thus, it can be seen that as long as the electric motor 32 is energized, the same drives the drive gear 46 in a direct drive relation and when the coupling 45 is disposed in its locked position, the drive gear 46 is directly interconnected to the shaft portion 38 of the drive roll 30 to cause the drive roll 30 to rotate in unison with the drive gear 46. However, when the coupling structure 45 is in its unlocked position, as illustrated in FIG. 6, the drive roll 30 is adapted to be rotated independently of the drive gear 46 even though the drive gear 46 is being rotated at a constant speed by the electric motor 32 as will be apparent hereinafter.

The coupling 45 comprises a coupling housing 50 telescopically disposed on the shaft portion 38 and fixed thereto to rotate in unison therewith in any suitable manner, such as by a set screw or the like. The left-hand side of the coupling housing 50 is suitably stepped to define internal annular shoulders 51, 52 and 53 and an open end 54 for clamping in a spun-over manner to a washer-like member 55 utilized to close the coupling housing 50. A coupling member 56 is telescopically disposed on the shaft portion 38 but is not fixed thereon so that the coupling member 56 can rotate relative thereto, the coupling member 56 having a disk-like portion 57 disposed within the coupling housing 50 and provided with an annular face 58 carrying an annular brake shoe-like resilient material 59 for bearing against the annular shoulder 52 of the coupling housing 50 in an interlocking manner to cause the coupling housing 50 to rotate in unison with the coupling member 56. However, the coupling member 56 is normally urged away from the annular shoulder 52 of the coupling housing 50 by a spring 60 bearing against the annular shoulder 51 of the coupling housing 50 and a slip surface 61 of the coupling member 56. When the coupling member 56 is adapted to be moved to the left by the spring 60 when the coupling 45 is in its unlocked position, the spring 60 causes the disk portion 57 of the coupling member 56 to bear against a slip surface 62 of the retaining washer 55 in the manner illustrated in FIG. 6. In this manner, the coupling member 56 can be continuously rotated by the drive gear 46 in a manner hereinafter set forth and the coupling housing 50 can remain stationary as the spring 60 will slip on the slip surface 61 of the coupling member 56 and the coupling member 56 will slip on the slip surface 62 of the retaining washer 55. While the slip surfaces 61 and 62 can be formed of any suitable material, the same can be formed of fluorocarbon material to facilitate the turning movement of the coupling member 56 relative to the spring 60 and retaining washer 55.

The drive gear 46 has a hub portion 63 journaled on a reduced portion 64 of the shaft 38 so as to be rotated relative thereto, the hub 63 having an end surface 65 adapted to bear against an end surface 66 of the coupling member 56 for a purpose hereinafter described. The end surface 65 of the hub 63 of the gear 46 is interrupted by slot means 67 which receives correspondingly outwardly directed tang means 68 of the coupling member 56 so as to spline the coupling member 56 and drive gear 46 together so that the same will rotate in unison.

Another reduced portion 69 of the shaft 38 projects beyond the reduced portion 64 thereof and is externally threaded to threadedly receive a knob or nut 70 thereon which has an end surface 71 for bearing against the drive gear 46. When the knob 70 is rotated in a direction to thread the same further onto the threaded portion 69 of the shaft 38 and cause the knob 70 to have its surface 71' moved from left to right in FIG. 6, such movement of the knob 70 causes the drive gear 46 and coupling member 56 to move to the right in unison therewith in opposition to the force of the spring 60 and cause the brake material 59 to be compacted in locked driving relation with the surface 52 of the coupling housing 50 whereby the drive gear 46 will be locked by the coupling 45 to the coupling housing 50 and, thus, to the shaft portion 38 of the drive roll 30 to cause the drive roll 30 to rotate in unison with the rotation of the drive gear 46 under the driving movement of the drive motor 32. However, when the nut 70 is rotated to back off of the threaded portion 68 of the shaft 38 to the position illustrated in FIG. 6, the spring 60 moves the coupling member 56 and drive gear 46 therewith so that the brake band 59 is out of driving relation with the surface 52 of the coupling housing 50 whereby the coupling 45 is in its unlocked position so that even though the drive gear 46 is rotating on the shaft 38 and rotating the coupling member 56 therewith, the shaft 38 and drive roll 30 remain stationary and can be moved independently of the drive gear 46 such as by a pulling out on the strip chart 24 and/or by a manual manipulator means for such purpose and now to be described.

As illustrated in FIG. 7, the shaft portion 37 of the drive roll 30 extends beyond the frame member 43 and has a sprocket gear 71 fastened thereto to rotate in unison with the drive roll 30. A manual manipulator means or knob 72 is interconnected to the shaft portion 37 to the right of the sprocket gear 71 by a slip clutch 73 so that should a person turn the manipulator means 72 in an attempt to turn the drive roll 30 independently of the drive gear 46 and the coupling 45 should happen to be in its locked position, the manipulator means 72 will slip on the shaft portion 37 so that the drive roll 30 will still be under the direct control of the drive gear 46 and can't be turned by the manipulator 72. Thus, the coupling 45 must be disposed in its unlocked position as illustrated in FIG. 6 before the manipulator means 72 can be rotated to rotate the drive gear 50 in unison therewith for the reasons previously set forth.

As illustrated in FIG. 7, the slip clutch 73 includes a lock ring 74 fastened to the shaft portion 37 and a pair of washer-like friction members 75 and 76 telescopically disposed on the shaft portion 37 and being adapted to bear against the lock ring 74 in stacked relation by a compression, clutch spring 77 bearing against the washer 76 at the outer periphery thereof and against a washer 78 at the other end thereof that is carried by the knob 72. The knob 72 is journaled on the shaft portion 37 of the drive roll 30 by its bearing means 79 and is held on the shaft portion 37 while being rotatable relative thereto by an enlarged head 80 of a threaded fastening member 81 threadedly disposed in the end bore 82' of the shaft portion 37 as illustrated in FIG. 7.

Thus, as long as the coupling 45 is in its unlocked position as illustrated in FIG. 6, rotation of the knob 72 causes the roll 30 to rotate in unison therewith because the clutch spring 77 is frictionally driven by the knob 72 and the spring 77 frictionally drives the washers 76 and 75 and, thus, lock ring 74 in unison therewith so that the shaft portion 37 rotates in unison with the knob 72 as long as the drive roll 30 is not restrained in its rotation by a certain force, such as would be the force provided by the drive gear 46 should the same be directly interconnected to the shaft portion 38 by the coupling 45 being disposed in its locked position.

The clutch spring 77 is best illustrated in FIGS. 9 and 10 and includes an annular portion 82 for telescoping on a desired structure and having a plurality of resilient bent tangs 83 about the outer periphery thereof to perform the compression slip and drive function previously described.

The supply roll means 29 includes a hollow core 84 adapted to have the opposed ends thereof telescoped onto opposed inserts 85 and 86 respectively rotatably carried by the side frame members 44 and 43 in a manner hereinafter described with such members 85 and 86 having enlarged disk-like back-up members 87 and 88 carried thereby to guide the roll 89 of chart paper 14 disposed on the core 84 thereof as it unwinds therefrom during the operation of the chart drive mechanism 28. The core 84 has slots therein that register with the ends of the pins 85' and 86' of the inserts 85 and 86 to provide a direct drive therebetween.

Similarly, the take-up roll means 31 for the drive mechanism 28 includes a hollow cylindrical core 90 having its opposed ends respectively disposed in telescoping relation onto insert members 91 and 92 respectively rotatably carried by the side frames 44 and 43 in a manner hereinafter described, with such inserts 91 and 92 carrying enlarged back-up disk-like members 93 and 94 to guide the slip chart 24 onto the core 90 as the strip chart 24 passes the drive roll 30 and is being taken up by the drive roll 31. The core 90 also has slots therein that register with the ends of the pins 91' and 92' of the inserts 91 and 92 to provide a direct drive therebetween. In addition the core 90 has means, such as a slot, for attaching the leading edge of the strip chart 24 thereto so as to be drawn thereon as the core 90 is rotated.

Because the structure of the supply roll 29 and take-up roll 31 of the drive mechanism 28 is identical, only the structure of the take-up roll 31 is illustrated in detail in FIG. 8 and will now be described with the understanding that like structure is provided for the supply roll 29 and is indicated by like reference numerals followed by the reference letter "A".

As illustrated in FIG. 8, the take-up roll 31 has the insert members 91 and 92 thereof respectively fixed to shaft portions 95 and 96 respectively journaled in openings 97 and 98 in the side frames 44 and 43 by suitable bearing means 99 and 100 as illustrated.

The shaft 95 is so constructed and arranged that the same not only can rotate in the bearing 99 but also the same can be axially movable therein whereby a compression spring 101 has one end 102 bearing against the bearing 99 and the other end 103 bearing against the insert 91 so as to continuously tend to urge the insert 91 and its associated plate 93 to the right in FIG. 8 to guide the chart material 24 being wound between such disk 93 and the cooperating disk 94 while permitting the shaft 95 and insert 91 to be moved to the left in opposition to the force of the compression spring 101 for chart roll insert and removal purposes as well as to compensate for misalignments as is well known in the art.

An adjusting knob or manual manipulator means 104 is telescopically disposed on the shaft portion 95 to the left of the frame 44 and is loosely disposed on the shaft 95 but is adapted to be interconnected thereto by a slip clutch 105.

The slip clutch 105 includes a clutch member 106 fastened to the shaft portion 95 by a set screw 107 so that the clutch member 106 will rotate in unison with the shaft portion 95. A clutch spring 108 is disposed between the clutch member 106 and the knob 104 with the clutch spring 108 being the same structure as the clutch spring 77 previously described whereby the knob 107 through the clutch spring 108 is adapted to cause rotational movement of the shaft 95 in unison therewith should there be no restraint placed on the take-up roll means 31 during such rotation of the knob 104. For example, should the coupling 45 be in its locked position and someone attempts to turn the manipulator means 104 in a direction to cause a pulling of the chart 24 from the drive roll 30 at a faster rate than being provided by the drive gear 46, such knob 104 will merely slip on the shaft 95 so that the accurate driving of the chart 24 by the drive roll 30 will not be affected by the manipulator 104. However, should the coupling 45 be disposed in the unlocked position of FIG. 6, the knob 104 can be rotated in a direction to cause the chart paper to wind up on the take-up roll 31 independently of the drive gear 46 in the same manner as the operation of the manipulator means 72 for the drive roll 30. Likewise, the manual manipulator means 104A for the supply roll means 29 can be operated in the manner previously described for the manipulator means 104 to cause movement of the drive roll 30 independently of the drive gear 46 when the coupling 45 is in its unlocked position.

The shaft portion 96 for the insert 92 of the take-up roll means 31 has a reduced portion 109 projecting beyond the bearing means 100 and is interconnected by a slip clutch 110 to a sprocket gear 111 telescoped on the reduced portion 109 and being disposed in driving relation with a drive chain 112 which is also in driving relation with the sprocket gear 71 of the drive roll 30 and a similar sprocket 111A of the supply roll 29.

The slip clutch 110 includes a nut-like washer 113 threaded on the reduced portion 109 of the shaft 96 and three washer-like members 114, 115 and 116 telescopically disposed on the reduced portion 109 of the shaft 96. The washer-like members 114 and 115 are respectively disposed on opposite sides of the sprocket gear 111 while the washer 116 is disposed adjacent the nut 113 and is urged into driving engagement therewith by a clutch spring 117 formed in the same manner as the clutch ring 77 previously described.

In this manner, the clutch spring 117 normally tends to compact the sprocket gear 111 and washers 114 and 115 together in stacked relation to rotate in unison with the spring 117 while the spring 117 compacts the washer 116 against the nut 113 so as to rotate in unison with the nut 113 so that as the sprocket gear 111 is driven by the chain 112, the clutch 110 normally tends to rotate the shaft 96 and, thus, the take-up roll 31 relative to the frames 44 and 43.

As illustrated in FIG. 5, the chain 112 is also disposed in driving relation with an idler gear or sprocket 118 mounted on an adjustable link 119 fastened to the frame wall 43 by a threaded fastening member 120 so as to maintain or take up any slack in the chain 112 in its threaded relation with the sprocket gears 71, 111 and 111A in a manner well known in the art.

The sprocket gearing of the chain mechanism 36 is such that the take-up roll 31 is adapted to be driven by the chain 112 at a rate faster than the rate of rotation of the drive gear 30 so as to always maintain slight tension on the chart 24 between the drive roll 30 and the take-up roll 31 as well as to take up any pulled out chart paper 24 that has had the recordings thereon reviewed so that the same can be fed back onto the take-up roll 31 at a faster rate to provide tension between the drive roll 30 and take-up roll 24. Such rotational movement of the take-up roll 24 at a rate faster than the rate drive roll 30 is permitted because of the slip clutch 110'. Similarly, the supply roll 29 is normally tending to be rotated at a different rate than the drive roll 30 by its sprocket gear 111A. However, since the roll 29 can slip relative to the sprocket 111A by its slip clutch means 110A, tension always exists between the drive roll 30 and the supply roll 29 to take up any slack therebetween. Of course, such take-up of the chart paper 24 between the supply roll 29 and drive roll 30 and between the drive roll 30 and the take-up roll 31 compensates for the changing size of the supply roll 29 and take-up roll 31 during the use of the recorder 20 whereby the drive roll 30 still maintains accurate constant movement of the chart paper 24 beneath the print head assembly 26 for receiving the markings 25 thereon in an accurate manner.

Thus, it can be seen that the chart drive mechanism 26 of this invention can be formed from various like parts to function in a manner now to be described.

With the coupling 45 disposed in its locked position by having the knob 70 rotated to compact the coupling member 56 against the coupling housing 50 in the manner previously described, operation of the drive motor 32 causes the drive roll 30 to rotate in a clockwise direction in FIG. 2 and cause the chart paper 24 to be fed from the supply roll 29 and beneath the print head assembly 26 to be taken up by the take-up roll 31 with the supply roll 29 and take-up roll 31 being driven by the drive chain 112 and slip clutches 110 and 110A in the manner previously described.

During such driving movement of the chart paper 24 by the drive roll 30, should the operator or the like desire to view the marked portion of the chart paper 24 now being stored on the continuously rotating take-up roll means 31, the front cover 22 of the recorder 20 is opened and the operator grasps the chart 24 below the drive roll 30 and pulls outwardly on the same. Because the coupling 45 is in its locked position, such outward pulling motion on the chart 24 below the drive roll 30 does not cause the drive roll 30 to rotate any differently than its normal rotation under the control of the drive gear 46 because of the direct connection therebetween. However, the take-up roll 31 can be rotated differently because of the slip clutch 110 between its sprocket drive gear 111 and the shaft 96.

Also, should the operator tend to turn the drive roll 30 by the manual manipulator means 72 while the coupling 45 is in its locked position, the manipulator means 72 will through its slip clutch 73 merely rotate relative to the roll 30. Similarly, should the operator tend to adjust the manipulator means 104 and 104A for the take-up roll 31 and supply roll 29, and the coupling 45 is in its locked position, the manipulator means 104 will slip relative to the respective rolls by the slip clutch means 105 and 105A.

Thus, the chart paper 24 is fed at an accurate rate beneath the print head assembly 26 to be continuously marked thereby without any outside interference as long as the drive motor 32 is operating and the coupling 45 is in its locked position.

In order to install new chart paper 24 in the recorder 20, the drive roll 30 is disengaged from the drive gear 46 by loosening of the knob 70 so that the coupling 45 can be in its unlocked position as illustrated in FIG. 6. The new chart paper supply roll has its core 84 pushed against the insert 85 with the outwardly directed pin 85' of the insert 85 being received in respective slots in the core 84. Thereafter, the other end of the core 84 of the supply roll 89 is engaged with the pin 86' of the insert 86. The chart paper 24 is then fed behind the drive roll 30 and properly engaged with the sprocket teeth 33 thereof. The manipulator means 72 is then turned to drive the drive roll 30 in the proper direction so that enough chart paper 24 extends beyond the same to be fastened to the take-up spool or core 90 that has been placed on the inserts 91 and 92 in the same manner as the supply core 84. When the chart paper 24 is attached to the take-up core 90, a chart paper table (not shown) is moved into the vertical position to maintain the chart paper below the drive roll 30 in substantially a vertical direction as illustrated schematically in FIG. 2. The knob 70 is then tightened to lock the coupling 45 in its driving position between the drive gear 46 and the drive roll 30. Thereafter, the knobs 104 and 104A for the take-up roll 31 and supply roll 29 are turned in the directions indicated in FIG. 4 to take up slack in the chart paper 24 and insure that the chart paper is under tension from the supply roll 29 to the take-up roll 31. Thereafter, the recorder 20 can be operated in the manner previously described.

Thus, it can be seen that this invention not only provides an improved strip chart mechanism for a multipoint recorder, but also this invention provides improved strip drive means for other devices as desired.

While the form of the invention now preferred has been disclosed as required by the patent statutes, other forms may be utilized, all coming within the scope of the appended claims.

What is claimed is:

1. In a recorder having a movable strip chart for recording purposes and marking means for marking on said chart as said chart is being moved by chart drive means of said recorder, said chart drive means comprising a strip chart supply roll, a chart drive roll and a chart take-up roll with said chart being fed from said supply roll around part of said drive roll and onto said take-up roll, the improvement comprising a drive gear, a coupling interconnecting said drive gear to said drive roll without slippage therebetween when said coupling is a locked position thereof and being adapted to disconnect said drive gear from said drive roll when in an unlocked position thereof, a manipulator means, and a slip clutch interconnecting said manipulator means to said drive roll whereby said manipulator means cannot turn said drive roll independently of said drive gear unless said coupling is in said unlocked position thereof.

2. In a recorder as set forth in claim 1, the further improvement wherein a second manipulator means is operatively interconnected to said coupling to manually set said coupling in said locked or unlocked positions thereof.

3. In a recorder as set forth in claim 2, the further improvement wherein said second manipulator means comprises a knob construction.

4. In a recorder as set forth in claim 2, the further improvement wherein said coupling has an axially movable member for locking and unlocking said coupling, said second manipulator means axially moving said member.

5. In a recorder as set forth in claim 1, the further improvement wherein said drive roll has a shaft means for rotatably mounting said drive roll, said coupling being carried by said shaft means.

6. In a recorder as set forth in claim 5, the further improvement wherein said slip clutch interconnects said manipulator means to said shaft means.

7. In a recorder as set forth in claim 1, the further improvement wherein at least one of said strip chart supply roll and said take-up roll has a manipulator means for adjusting said one roll, and a slip clutch means interconnecting said last-named manipulator means to said one roll.

8. In a recorder as set forth in claim 7, the further improvement wherein said one roll has shaft means rotatably mounting said one roll, said slip clutch means being mounted on said shaft means.

9. In a recorder as set forth in claim 8, the further improvement wherein said drive roll, said supply roll and said take-up roll are drivingly interconnected together by a flexible drive belt, said one roll having another slip clutch interconnecting said flexible drive belt to said one roll.

10. In a recorder as set forth in claim 9, the further improvement wherein said other slip clutch is disposed on said shaft means of said one roll.

11. A chart drive mechanism comprising a frame, a strip chart supply roll means rotatably carried by said frame, a chart drive roll means rotatably carried by said frame, a chart take-up roll means rotatably carried by said frame, a drive gear, a coupling interconnecting said drive gear to said drive roll means without slippage therebetween when said coupling is a locked position thereof and being adapted to disconnect said drive gear from said drive roll means when in an unlocked position thereof, a manipulator means, and a slip clutch interconnecting said manipulator means to said drive roll means whereby said manipulator means cannot turn said drive roll means independently of said drive gear unless said coupling is in said unlocked position thereof.

12. A chart drive mechanism as set forth in claim 11 wherein a second manipulator means is operatively interconnected to said coupling to manually set said coupling in said locked or unlocked position thereof.

13. A chart drive mechanism as set forth in claim 12 wherein said second manipulator means comprises a knob construction.

14. A chart drive mechanism as set forth in claim 12 wherein said coupling has an axially movable member for locking and unlocking said coupling, said second manipulator means axially moving said member.

15. A chart drive mechanism as set forth in claim 11 wherein said drive roll means has a shaft means rotatably mounting said drive roll means to said frame, said coupling being carried by said shaft means.

16. A chart drive mechanism as set forth in claim 15 wherein said slip clutch interconnects said manipulator means to said shaft means.

17. A chart drive mechanism as set forth in claim 11 wherein at least one of said strip chart supply roll means and said take-up roll means has a manipulator means for adjusting said one roll means, and a slip clutch means interconnecting said last-named manipulator means to said one roll means.

18. A chart drive mechanism as set forth in claim 17 wherein said one roll means has shaft means rotatably mounting said one roll means to said frame means, said slip clutch means being mounted on said shaft means.

19. A chart drive mechanism as set forth in claim 18 wherein said drive roll means, said supply roll means and said take-up roll means are drivingly interconnected together by a flexible drive belt, said one roll means having another slip clutch interconnecting said flexible drive belt to said one roll means.

20. A chart drive mechanism as set forth in claim 19 wherein said other slip clutch is disposed on said shaft means of said one roll means.

\* \* \* \* \*